United States Patent
Ideshio et al.

(10) Patent No.: US 8,267,223 B2
(45) Date of Patent: Sep. 18, 2012

(54) DRIVE ASSEMBLY AND MOTOR VEHICLE EQUIPPED WITH DRIVE ASSEMBLY

(75) Inventors: Yukihiko Ideshio, Susono (JP); Shuji Nagano, Susono (JP); Kunio Morisawa, Toyota (JP); Hiroki Maki, Nisshin (JP); Koichi Okuda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 915 days.

(21) Appl. No.: 11/792,672

(22) PCT Filed: Jul. 25, 2006

(86) PCT No.: PCT/JP2006/015086
§ 371 (c)(1),
(2), (4) Date: Jun. 8, 2007

(87) PCT Pub. No.: WO2007/013642
PCT Pub. Date: Feb. 1, 2007

(65) Prior Publication Data
US 2008/0128208 A1    Jun. 5, 2008

(30) Foreign Application Priority Data

Jul. 28, 2005 (JP) .................................. 2005-219140
Jun. 14, 2006 (JP) .................................. 2006-165183

(51) Int. Cl.
*F01M 1/00* (2006.01)
(52) U.S. Cl. .......................................... 184/6; 184/6.12
(58) Field of Classification Search .................. 184/6.12
See application file for complete search history.

(56) References Cited

U.S. PATENT DOCUMENTS 3,529,698 A * 9/1970 Nelson .......................... 184/6.12
(Continued)

FOREIGN PATENT DOCUMENTS

DE    825 359    3/1952
(Continued)

OTHER PUBLICATIONS

Jul. 29, 2009, Office Action issued in European Application No. 06 768 393.8.

*Primary Examiner* — Robert A Siconolfi
*Assistant Examiner* — James Hsiao
(74) *Attorney, Agent, or Firm* — Oliff & Berridge, PLC (57) ABSTRACT

In a drive assembly of the invention, a first catch tank is provided above a casing that keeps lubricating oil accumulated in a bottom thereof for immersion of part of a rotor of a motor MG3 and of part of a differential ring gear of a differential gear. The first catch tank temporarily keeps the lubricating oil scooped up from the bottom of the casing by the rotation of the differential ring gear. The lubricating oil kept in the first catch tank is flowed down by the force of gravity and is fed to peripheral bearings. A second catch tank is arranged to temporarily keep the lubricating oil scooped up from the bottom of the casing by the rotation of the rotor of the motor MG3. The lubricating oil kept in the second catch tank is flowed down by the force of gravity and is fed to peripheral bearings. This arrangement desirably shortens oil paths connecting the respective catch tanks to the peripheral bearings and ensures smooth supply of the lubricating oil to all the peripheral bearings and other oil-requiring sites.

10 Claims, 10 Drawing Sheets

U.S. PATENT DOCUMENTS

2004/0154846 A1 * 8/2004 Kira .................... 180/65.6

FOREIGN PATENT DOCUMENTS

| | | |
|---|---|---|
| DE | 1 047 820 B | 12/1958 |
| DE | 102 54 572 A1 | 3/2004 |
| EP | 1 375 971 A1 | 1/2004 |
| JP | U-63-70250 | 5/1988 |
| JP | A-2001-173762 | 6/2001 |
| JP | A-2002-115685 | 4/2002 |
| JP | A-2002-295647 | 10/2002 |
| JP | A-2004-180477 | 6/2004 |
| JP | A-2005-083471 | 3/2005 |
| JP | A-2006-307908 | 11/2006 |
| JP | A-2007-032797 | 2/2007 |

* cited by examiner

FIG.13 ical field

The present invention relates to a drive assembly that is mounted on a motor vehicle driven with power output to an axle and works to actuate the axle, as well as to a motor vehicle equipped with such a drive assembly.

BACKGROUND ART

In one proposed structure of a drive assembly, a driven gear of a differential arrangement works to scoop up the oil accumulated in an oil pool into an upper catch tank (see, for example, Japanese Patent Laid-Open Gazette No. 2004-180477). The prior art drive assembly feeds the oil kept in the catch tank to a motor through oil paths formed in a main shaft and a motor shaft, while feeding the oil from a motor chamber to respective parts of a reduction gear unit through an oil path formed in a counter shaft. These oil feeds aim at cooling the motor down and at lubricating the respective parts of the reduction gear unit. Storage of the oil in the upper catch tank intends to lower the oil level of the oil pool and thereby decrease the stirring resistance of the differential arrangement.

DISCLOSURE OF THE INVENTION

The drive assembly is typically provided in a limited space of a motor vehicle. This restricts the size and the shape of the catch tank and requires a long oil path for the oil feed to a distant site from the catch tank. Such restriction may give a complicated structure of the drive assembly and may cause insufficient supply of the oil to the distant site from the catch tank. The prior art drive assembly uses the driven gear of the differential arrangement to scoop up the oil into the catch tank. A relatively low vehicle speed naturally leads to a relatively low rotation speed of the differential arrangement and may cause inadequate scoop-up of the oil into the catch tank. Storage of a small quantity of oil in the catch tank under such conditions gives only the low cooling performance and the low lubricating performance and does not sufficiently lower the oil level of the oil pool. This does not sufficiently decrease the stirring resistance of the differential arrangement and undesirably increases the total energy loss of the drive assembly. A large-size differential arrangement eliminates such problems but undesirably occupies the limited space of the motor vehicle.

The drive assembly of the invention is mounted on a motor vehicle driven with power output to an axle and works to actuate the axle. The drive assembly of the invention and the motor vehicle equipped with the drive assembly aim to ensure smooth supply of a fluid medium to multiple different fluid-requiring sites. The drive assembly of the invention and the motor vehicle equipped with the drive assembly also aim to attain effective use of a vehicle space.

In order to attain at least part of the above and the other related objects, the drive assembly of the invention and the motor vehicle equipped with the drive assembly have the configurations discussed below.

The present invention is directed to a drive assembly that is mounted on a motor vehicle driven with power output to an axle and works to actuate the axle. The drive assembly of the invention includes: a power source unit that outputs power to the axle; and a fluid medium supply mechanism that includes a lower fluid reservoir and a plurality of upper fluid reservoirs and causes a fluid medium kept in the plurality of upper fluid reservoirs to be flowed down by the force of gravity and to be fed to plural different sites of the power source unit, the lower fluid reservoir formed in a lower portion of the drive assembly to keep the fluid medium accumulated therein for soaking at least respective parts of plural mechanical elements of the power source unit, the plurality of upper fluid reservoirs formed at a plurality of different locations in an upper portion of the drive assembly to keep the fluid medium scooped up by the plural mechanical elements.

In the drive assembly of the invention, the multiple upper fluid reservoirs are provided at the multiple different locations in the upper portion of the drive assembly to keep the fluid medium scooped up by the multiple mechanical elements of the power source unit. The fluid medium kept in the multiple upper fluid reservoirs is flowed down by the force of gravity and is fed to the plural different sites of the power source unit. This arrangement ensures smooth supply of the fluid medium to multiple different fluid-requiring sites of the power source unit. Here the terminology 'fluid medium' typically includes lubricating oil.

In the drive assembly of the invention, the fluid medium supply mechanism has at least one guide element that changes a flow direction of the fluid medium scooped up by at least one of the plural mechanical elements of the power source unit and guides the changed flow of the fluid medium to at least one of the upper fluid reservoirs corresponding to the at least one of the mechanical elements. This arrangement ensures flexible arrangement of the upper fluid reservoirs. The drive assembly may be effectively used to arrange the upper fluid reservoirs.

In the drive assembly of the invention, the power source unit may include a rotating electrical machine having at least one portion soaked in the fluid medium accumulated in the lower fluid reservoir, and a gear train having at least one portion soaked in the fluid medium accumulated in the lower fluid reservoir, the gear train mechanically connecting a rotating shaft of the rotating electrical machine with the axle of the motor vehicle. The multiple upper fluid reservoirs may include a first upper fluid reservoir for keeping the fluid medium scooped up by the rotating electrical machine and a second upper fluid reservoir for keeping the fluid medium scooped up by the gear train. The fluid medium supply mechanism may feed the fluid medium kept in the first upper fluid reservoir to a specific site near to the first upper fluid reservoir among the plural different sites of the power source unit, and feed the fluid medium kept in the second upper fluid reservoir to a specific site near to the second upper fluid reservoir among the plural different sites of the power source unit. In the drive assembly of this embodiment, the rotating electrical machine may be transversely arranged to have the rotating shaft substantially parallel to the axle of the motor vehicle, and the first upper fluid reservoir may be located adjacent to the rotating electrical machine on a side of the axle. This arrangement effectively attains overall size reduction of the drive assembly. The rotating electrical machine may be a motor having a rotor with salient poles formed thereon. The rotating electrical machine may have a rotor with scoop-up acceleration means for accelerating scoop-up of the fluid medium into the first upper fluid reservoir.

In drive assembly of the invention, the power source unit may include a rotating electrical machine and a gear train having at least one portion soaked in the fluid medium accumulated in the lower fluid reservoir, the gear train mechanically connecting a rotating shaft of the rotating electrical machine with the axle of the motor vehicle, and each of the upper fluid reservoirs may be arranged to correspond to any gear of the gear train and keeps the fluid medium scooped up by the corresponding gear, at least one gear corresponding to the upper fluid reservoir being capable of scooping up the fluid medium accumulated in the lower fluid reservoir to the corresponding upper fluid reservoir in accordance with an attitude of the drive assembly. In this drive assembly, even in the varying attitude of the drive assembly, at least one of the multiple different gears respectively corresponding to the multiple upper fluid reservoirs works to scoop up the fluid medium accumulated in the lower fluid reservoir into the corresponding upper fluid reservoir. This arrangement desirably ensures sufficient storage of the fluid medium in the respective upper fluid reservoirs and enables smooth supply of the fluid medium to the multiple fluid-requiring sites of the power source unit.

In one preferable structure of this embodiment, the rotating electrical machine is transversely arranged to have the rotating shaft substantially parallel to the axle of the motor vehicle. The gear train includes at least two large-diameter gears that respectively have at least parts soaked in the fluid medium accumulated in the lower fluid reservoir and axial centers apart from each other in a direction substantially perpendicular to the axle of the motor vehicle. The multiple upper fluid reservoirs include at least two upper fluid reservoirs respectively arranged corresponding to the at least two large-diameter gears. Even in the forward tilting attitude or in the backward tilting attitude of the drive assembly in the direction substantially perpendicular to the axle of the motor vehicle, at least one of the two large-diameter gears works to scoop up the fluid medium accumulated in the lower fluid reservoir to the corresponding upper fluid reservoir. This arrangement ensures smooth supply of the fluid medium to the multiple different fluid-requiring sites of the power source unit.

In still another preferable embodiment of the drive assembly of the invention, the power source unit includes a rotating electrical machine and a gear train that has at least one part soaked in the fluid medium accumulated in the lower fluid reservoir and works to mechanically connect a rotating shaft of the rotating electrical machine with the axle of the motor vehicle. The multiple upper fluid reservoirs are arranged in a neighborhood of the gear train. The fluid medium kept in the multiple upper fluid reservoirs arranged at the periphery of the gear train effectively reduces the potential vibrations of the drive assembly due to the gear engagement noise. This arrangement desirably saves the cost and the space required for vibration suppression.

The present invention is also directed to a motor vehicle equipped with a drive assembly having any of the above arrangements. The motor vehicle of the invention equipped with the drive assembly described above exerts the similar effects to those of the drive assembly of the invention. For example, the arrangement of the motor vehicle ensures smooth supply of the fluid medium to multiple different fluid-requiring sites of the power source unit and attains effective use of a vehicle space for arrangement of the multiple upper fluid reservoirs.

BEST MODES OF CARRYING OUT THE INVENTION

Several modes of carrying out the invention are described below as preferred embodiments with reference to the accompanied drawings.

First Embodiment

Figure 1:
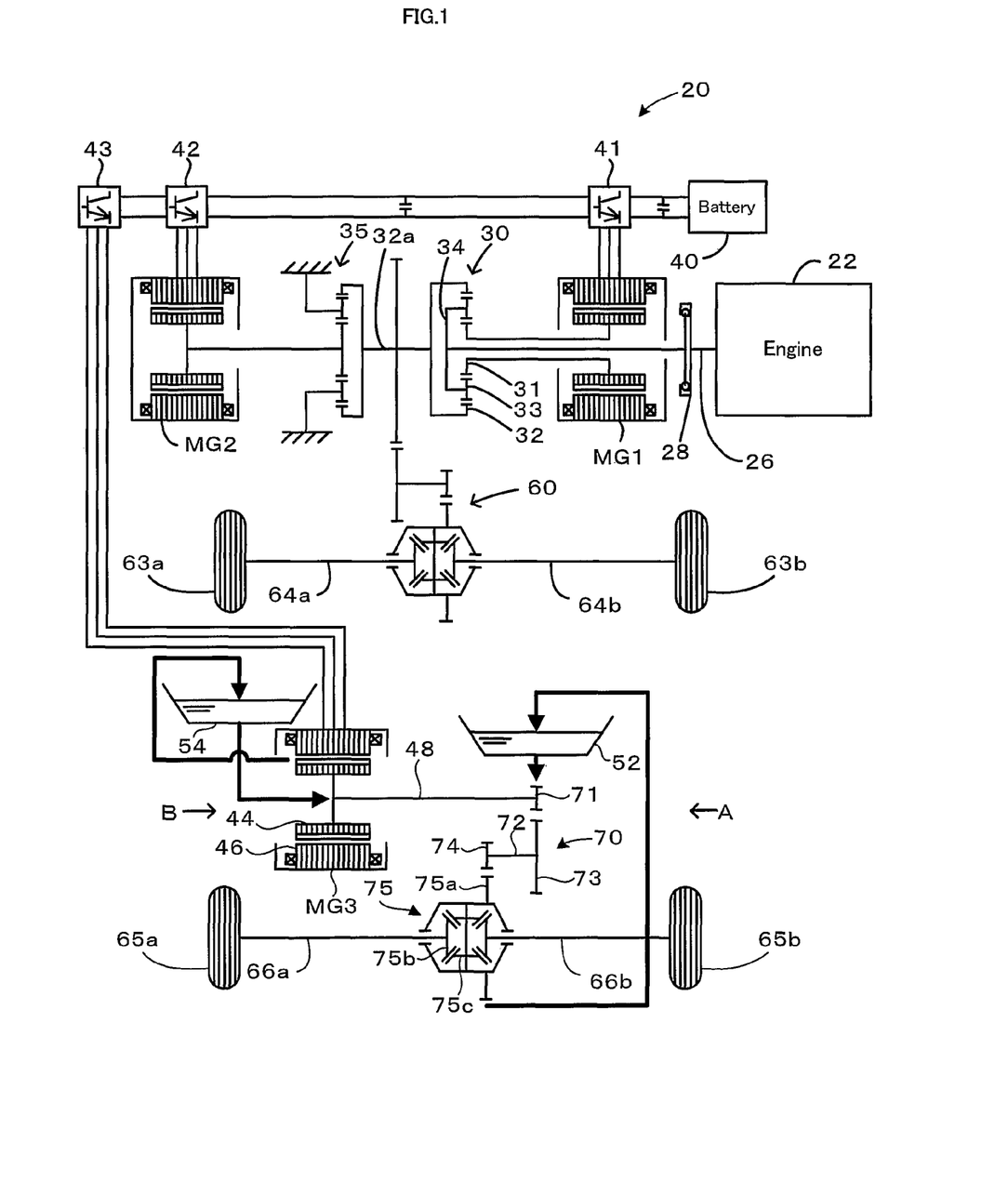
FIG. 1 schematically illustrates the configuration of a hybrid vehicle equipped with a drive assembly in a first embodiment of the invention.

FIG. 1 schematically illustrates the configuration of a hybrid vehicle 20 equipped with a drive assembly in a first embodiment of the invention. As illustrated, the hybrid vehicle 20 is a four wheel-drive automobile having a front wheel drive system for driving front wheels 63a and 63b and a rear wheel drive system for driving rear wheels 65a and 65b, which is constructed as the drive assembly of this embodiment.

The front wheel drive system includes an engine 22, a planetary gear 30 having a carrier 34 that supports multiple pinion gears 33 and is connected to a crankshaft 26 of the engine 22 via a damper 28, a motor MG1 that is linked to a sun gear 31 of the planetary gear 30, a motor MG2 that is linked to a ring gear 32 of the planetary gear 30 via a ring gear shaft 32a and a reduction gear 35, and a gear train 60 that is connected with the ring gear shaft 32a and includes a differential gear linked to front shafts 64a and 64b of the front wheels 63a and 63b. The power output from the engine 22 and the motors MG1 and MG2 to the ring gear shaft 32a goes through speed reduction and is transmitted to the front shafts 64a and 64b to drive the front wheels 63a and 63b. In this embodiment, each of the motors MG1 and MG2 is a known PM-type synchronous motor having a rotor with permanent magnets set on an outer surface thereof and a stator with three-phase coils wounded thereon. The motors MG1 and MG2 respectively transmit electric power to and from a battery 40 via inverters 41 and 42.

Figure 2:
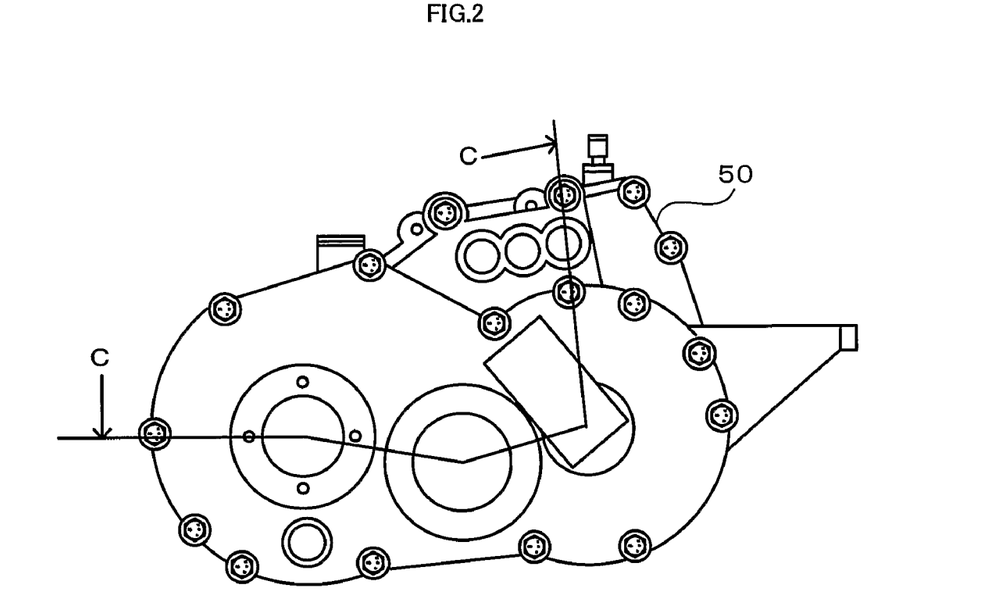
FIG. 2 is an external view showing the appearance of a rear wheel drive system constructed as the drive assembly of the first embodiment, seen from a direction A in FIG. 1.
Figure 3:
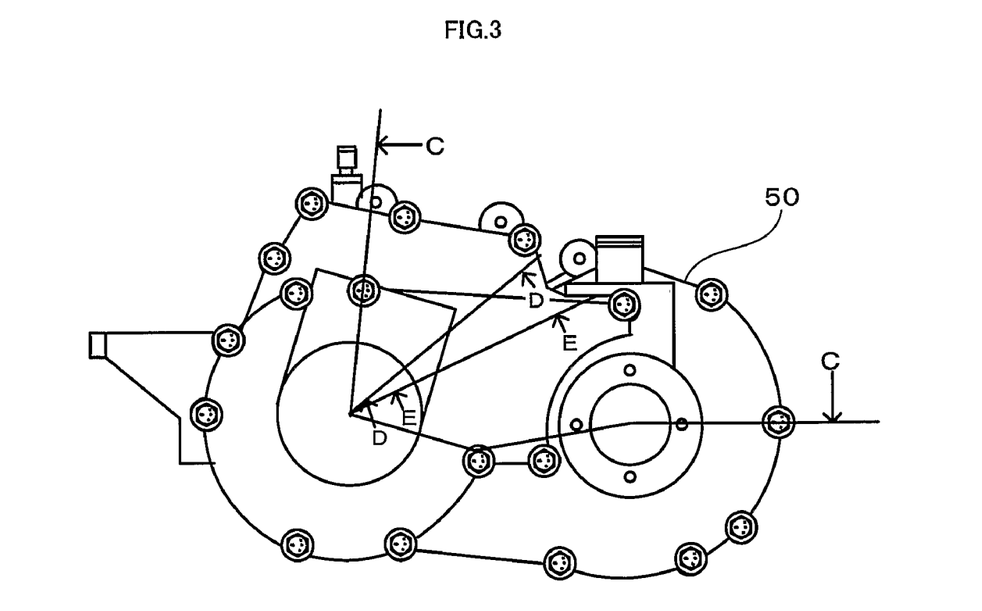
FIG. 3 is an external view showing the appearance of the rear wheel drive system, seen from a direction B in FIG. 1.

FIG. 2 is an external view showing the appearance of the rear wheel drive system, seen from a direction A in FIG. 1. FIG. 3 is an external view showing the appearance of the rear wheel drive system, seen from a direction B in FIG. 1. The rear wheel drive system includes a motor MG3 and a gear train 70 that is linked to a motor shaft 48 of the motor MG3 and includes a differential gear 75 connected to rear shafts 66a and 66b of the rear wheels 65a and 65b. The power output from the motor MG3 goes through speed reduction and is transmitted to the rear shafts 66a and 66b to drive the rear wheels 65a and 65b. In this embodiment, the motor MG3 is a synchronous reluctance motor having a rotor 44 with salient poles and a stator 46 with three-phase coils wounded thereon. The motor MG3 transmits electric power to and from the battery 40 via an inverter 43. The gear train 70 includes a counter drive gear 71 that is mounted on an end of the motor shaft 48 connecting with the rotor 44 of the motor MG3, a counter driven gear 73 that is mounted on one end of the counter shaft 72 and engages with the counter drive gear 71, a differential pinion gear 74 that is mounted on an opposite end of the counter shaft 72, and a differential gear 75. The differential gear 75 includes a differential ring gear 75a engaging with the differential pinion gear 74, side gears 75b connecting with the rear shafts 66a and 66b, and a pinion gear 75c. The counter drive gear 71, the counter driven gear 73, the differential pinion gear 74, and the differential ring gear 75a of the differential gear 75 are combined to function as a reduction gear unit.

Figure 4:
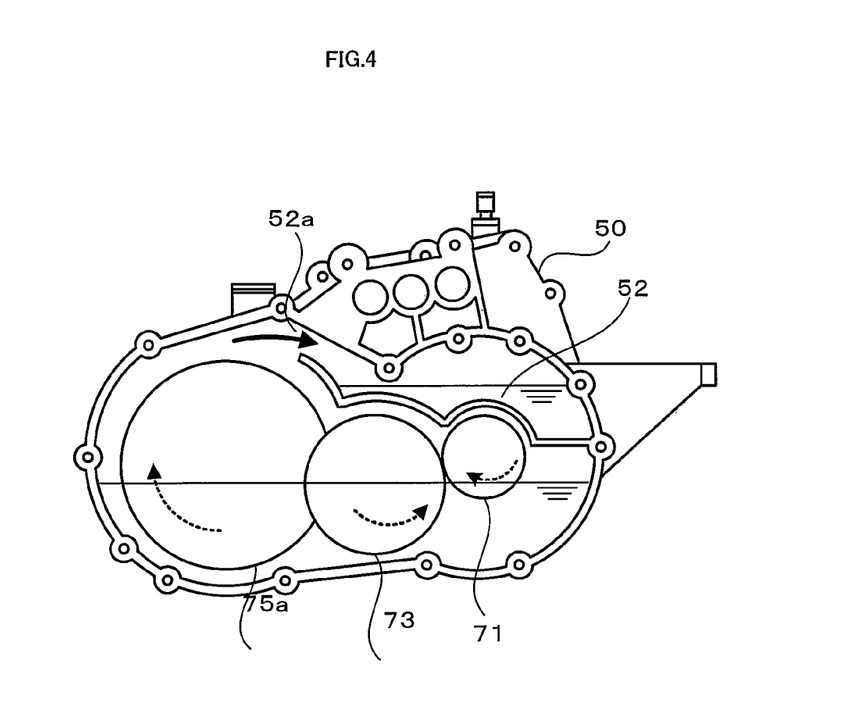
FIG. 4 shows the internal structure of the rear wheel drive system corresponding to the external view of FIG. 2.
Figure 5:
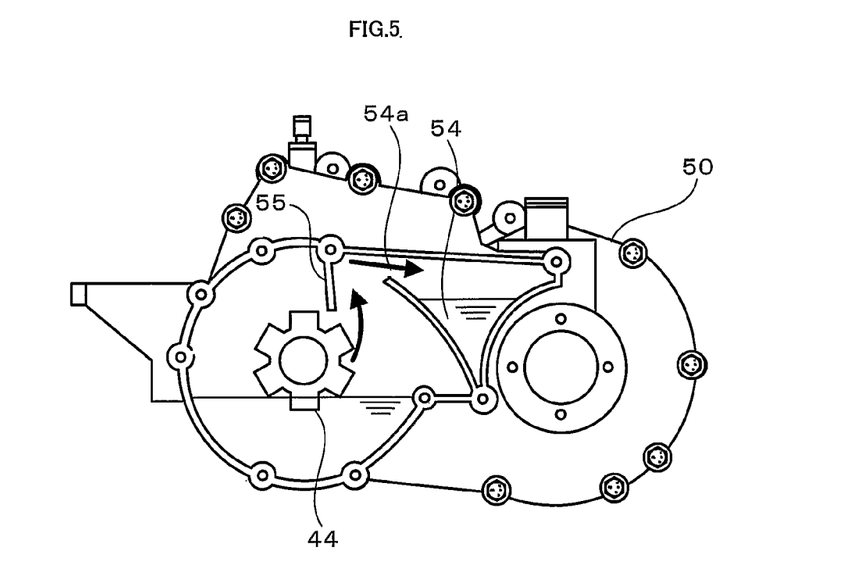
FIG. 5 shows the internal structure of the rear wheel drive system corresponding to external view of FIG. 3.
Figure 6:
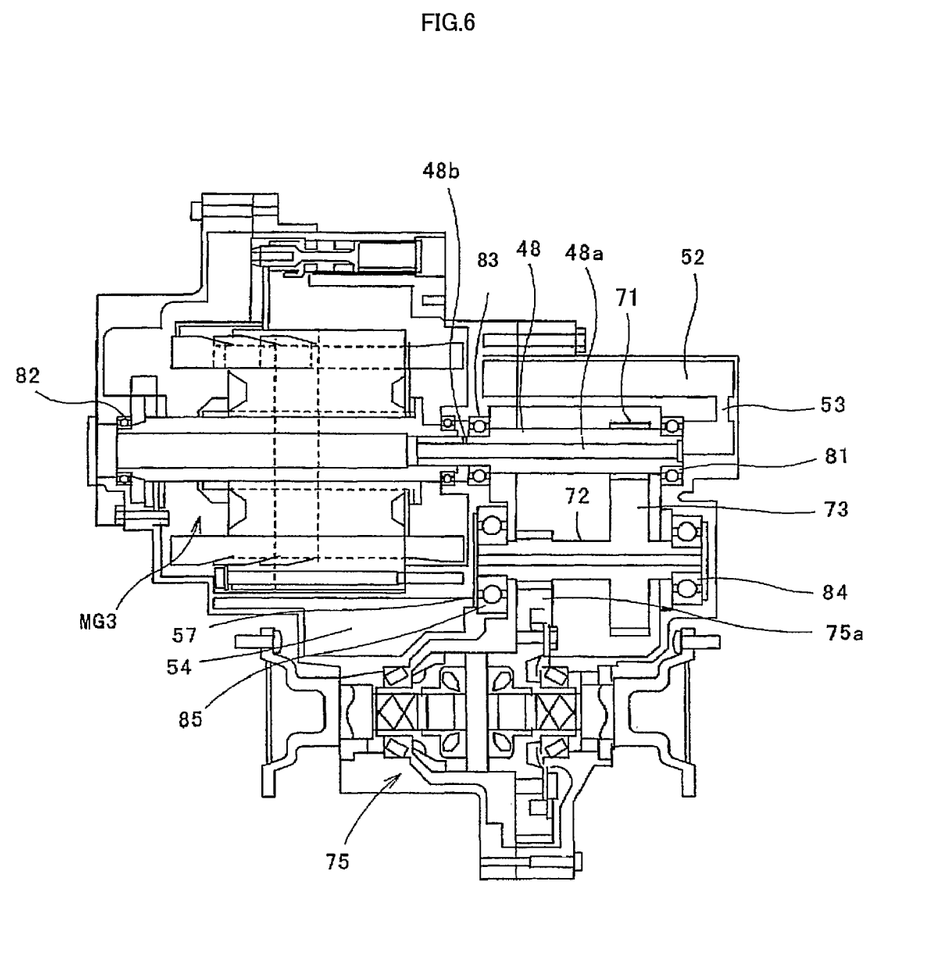
FIG. 6 is a sectional view showing the rear wheel drive system along lines C-C in FIGS. 2 and 3.

The rear wheel drive system has a lubricating mechanism described below. FIG. 4 shows the internal structure of the rear wheel drive system corresponding to the external view of FIG. 2. FIG. 5 shows the internal structure of the rear wheel drive system corresponding to external view of FIG. 3. FIG. 6 is a sectional view showing the rear wheel drive system along lines C-C in FIGS. 2 and 3. As shown in FIGS. 4 through 6, the lubricating mechanism has a casing 50 that receives the motor MG3 and the gear train 70 therein and keeps lubricating oil accumulated in a bottom thereof to allow immersion of part of the differential ring gear 75a of the differential gear 75 and of part of the rotor 44 of the motor MG3. The lubricating mechanism also has two catch tanks 52 and 54 that are located at different positions above the casing 50 to temporarily keep the lubricating oil therein. The lubricating oil kept in the two catch tanks 52 and 54 is flowed down mainly by the force of gravity and is fed to multiple bearings 81 through 83 that support the motor shaft 48 in a rotatable manner and to multiple bearings 84 and 85 that support the counter shaft 72 in a rotatable manner.

As shown in FIG. 4, the catch tank 52 is provided above the counter drive gear 71 and the counter driven gear 73. The catch tank 52 has an opening 52a located on the top of the differential ring gear 75a of the differential gear 75. The catch tank 52 temporarily keeps the lubricating oil scooped up by the differential ring gear 75a and introduced through the opening 52a. An oil path 53 is formed in the bottom of the catch tank 52 to be extended to the bearing 81, which supports a right end of the motor shaft 48 as shown in FIG. 6. The motor shaft 48 has an inner oil path 48a connecting with the oil path 53, and a through hole 48b extended from the inner oil path 48a to the bearing 83, which supports a middle part of the motor shaft 48 as shown in FIG. 6. Another oil path (not shown) is also formed in the bottom of the catch tank 52 to be extended to the bearing 84, which supports a right end of the counter shaft 72 as shown in FIG. 6.

Figure 7:
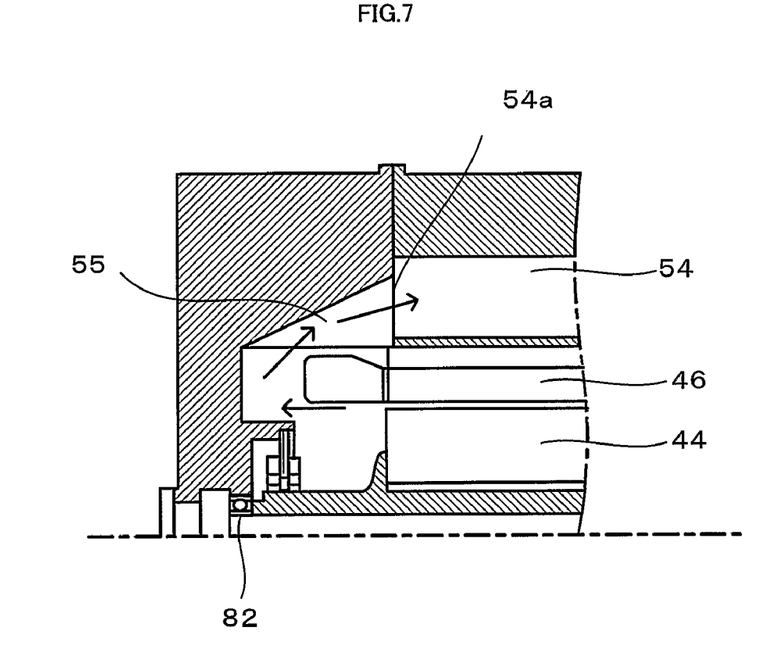
FIG. 7 is a sectional view showing the rear wheel drive system along a line D-D in FIG. 3.
Figure 8:
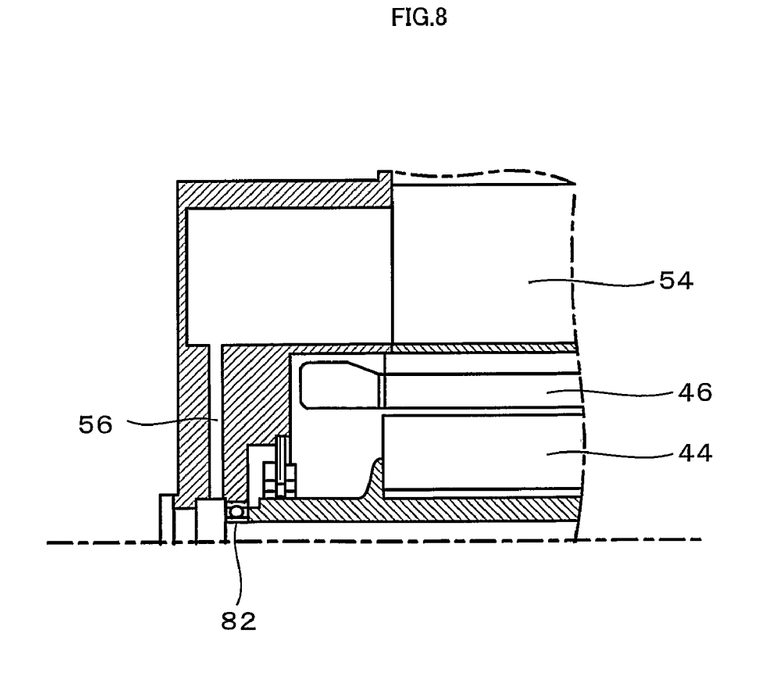
FIG. 8 is a sectional view showing the rear wheel drive system along a line E-E in FIG. 3.

As shown in FIG. 5, the catch tank 54 is provided independently of the catch tank 52 and is located adjacent to the motor MG3 on the side of the rear shafts 66a and 66b, which is opposite to the rotating direction of the rotor 44 of the motor MG3 during a normal forward drive of the hybrid vehicle 20. The catch tank 54 has an opening 54a above the rotor 44. The catch tank 54 temporarily keeps the lubricating oil scooped up by the rotor 44 of the motor MG3 and introduced through the opening 54a. FIG. 7 is a sectional view showing the rear wheel drive system along a line D-D in FIG. 3. FIG. 8 is a sectional view showing the rear wheel drive system along a line E-E in FIG. 3. As shown in FIG. 7, a guide wall 55 to the upper catch tank 54 is extended from a left-side space of a gap between the rotor 44 and the stator 46 of the motor MG3. The lubricating oil is pressed by the salient poles formed on the rotor 44 in an axial direction of the motor MG3 with turning in a rotating direction of the motor MG3. The turning and pressing flow of the lubricating oil hits against the guide wall 55, runs along the guide wall 55 in an opposite direction, and is fed through the opening 54a into the catch tank 54. An oil path 56 is formed in the bottom of the catch tank 54 to be extended to the bearing 82, which supports a left end of the motor shaft 48 as shown in FIG. 8. Another oil path 57 is also formed in the bottom of the catch tank 54 to be extended to the bearing 85, which supports a left end of the counter shaft 72 as shown in FIG. 6.

The lubricating mechanism of the above construction has lubricating operations described below. During a drive of the hybrid vehicle 20, the rear wheels 65a and 65b are driven to rotate the differential ring gear 75a and the rotor 44 of the motor MG3. The lubricating oil accumulated in the bottom of the casing 50 is scooped up by the differential ring gear 75a and is temporarily kept in the catch tank 52, while being scooped up by the rotor 44 of the motor MG3 to be temporarily kept in the catch tank 54. The lubricating oil kept in the catch tank 52 is flowed down by the force of gravity through the oil path 53, the oil path 48a, and the through hole 48b and is fed to the bearings 81, 83, and 84 for lubrication. The lubricating oil fed to lubricate the bearings 81, 83, and 84 is dropped down and is again scooped up by the differential ring gear 75a to be temporarily kept in the catch tank 52. The lubricating oil kept in the catch tank 54 is flowed down by the force of gravity through the oil path 56 and the oil path 57 and is fed to the bearings 82 and 85 for lubrication. The lubricating oil fed to lubricate the bearings 82 and 85 is dropped down and is again scooped up by the rotor 44 of the motor MG3 to be temporarily kept in the catch tank 54.

As described above, the drive assembly of the first embodiment has the two catch tanks 52 and 54 to temporarily keep the lubricating oil therein. The lubricating oil kept in the catch tank 52 is fed to the bearings 81, 83, and 84 located in the vicinity of the catch tank 52, whereas the lubricating oil kept in the catch tank 54 is fed to the bearings 82 and 85 located in the vicinity of the catch tank 54. This structure of the embodiment desirably shortens the oil paths leading from the respective catch tanks to the sites of interest for lubrication, compared with a conventional structure with only one catch tank. The structure of the embodiment ensures smooth supplies of the lubricating oil to the individual sites of interest for lubrication without using a pump or any other equivalent means and thus enables effective lubrication of the gear train 70 (including the bearings 81 through 85). Discrete arrangement of the two separation catch tanks 52 and 54 enables the effective use of the limited space of the hybrid vehicle 20. The rotor 44 of the motor MG3 and the differential ring gear 75a are used to scoop up the lubricating oil into the two catch tanks 52 and 54. During the drive of the hybrid vehicle 20, this arrangement enables the quick scoop-up of the lubricating oil into the two catch tanks 52 and 54 and thus promptly lowers the surface of the lubricating oil accumulated in the bottom of the casing 50. The lowered surface of the accumulated lubricating oil desirably reduces the stirring resistance of the motor MG3 and the differential gear 75. The catch tank 54 is located adjacent to the motor MG3 on the side of the rear shafts 66a and 66b, which is opposite to the rotating direction of the rotor 44 of the motor MG3 during the normal forward drive of the hybrid vehicle 20. The flow of the lubricating oil scooped up by the rotor 44 of the motor MG3 runs along the guide wall 55 and is led to the catch tank 54. This arrangement enables the total size reduction of the drive assembly.

The drive assembly has the two catch tanks 52 and 54 in the structure of the first assembly but may have three or more catch tanks.

In the drive assembly of the first embodiment, the catch tank 52 is located above the counter drive gear 71 and the counter driven gear 73. The catch tank 54 is located adjacent to the motor MG3 on the side of the rear shafts 66a and 66b, which is opposite to the rotating direction of the rotor 44 of the motor MG3 during the normal forward drive of the hybrid vehicle 20. This arrangement is, however, not restrictive, and the catch tanks 52 and 54 may be located in a different arrangement.

Figure 9:
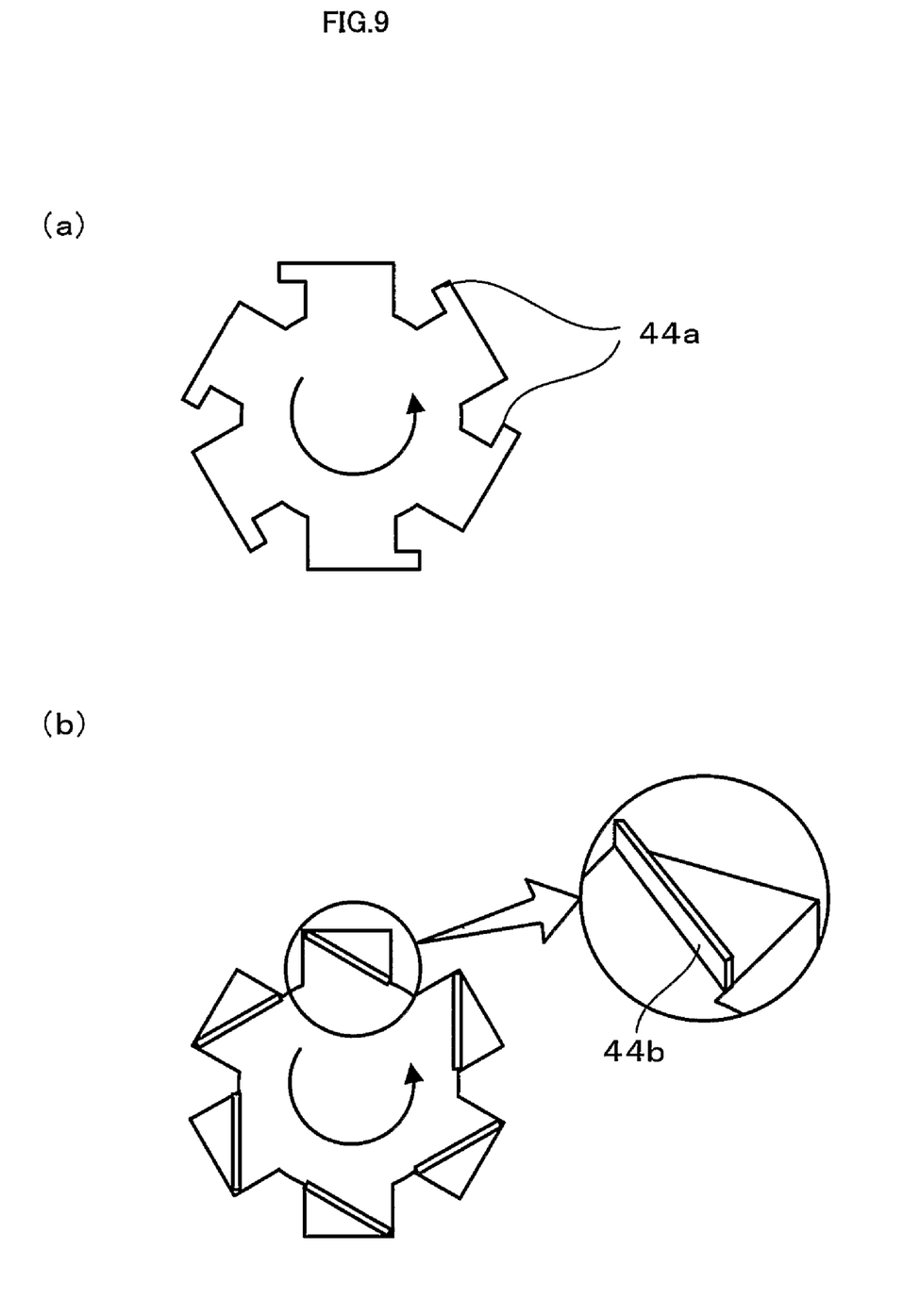
FIG. 9 shows other available shapes of a rotor of a motor MG3 included in the rear wheel drive system.

In the drive assembly of the first embodiment, the lubricating oil is scooped up into the catch tank 54 by means of the salient poles formed on the rotor 44 of the motor MG3. In one modified structure of FIG. 9(a), the salient poles formed on the rotor 44 respectively have scoop-up claws 44a. In another modified structure of FIG. 9(b), the rotor 44 has scoop-up blades 44b formed around its periphery. Either of these structures ensures quick scoop-up of the lubricating oil into the catch tank 54 even during a relatively low-speed drive of the hybrid vehicle 20.

The drive assembly of the first embodiment is constructed as the rear wheel drive system to drive the rear wheels 65a and 65b but may be constructed as the front wheel drive system to drive the front wheels 63a and 63b.

In the drive assembly of the first embodiment, the rear wheels 65a and 65b are driven with the output power of the motor MG3. The power source for driving the rear wheels 65a and 65b is, however, not restricted to the motor MG3. The rear wheels 65a and 65b may be driven with the output power of any other power source, for example, an engine.

In the hybrid vehicle 20 equipped with the drive assembly of the first embodiment, the front wheels 63a and 63b are driven with the output powers of the engine 22 and the motors MG1 and MG2. The power source for driving the front wheels 63a and 63b is, however, not restricted to all of the engine 22 and the motors MG1 and MG2. The front wheels 63a and 63b may be driven with the output power of only an engine, with the output power of only one or plural motors, or with the output power of any other power source.

The first embodiment regards the drive assembly mounted on the four-wheel-drive hybrid vehicle 20. The drive assembly of the invention may, however, be applied to a two-wheel-drive motor vehicle.

Second Embodiment

A drive assembly of another configuration is described below as a second embodiment of the invention. The drive assembly of the second embodiment is also applicable as the rear wheel drive system of the hybrid vehicle 20 of the first embodiment. The like elements in the drive assembly of the second embodiment to those in the drive assembly of the first embodiment are expressed by the like numerals and symbols and are not described in detail.

Figure 10:
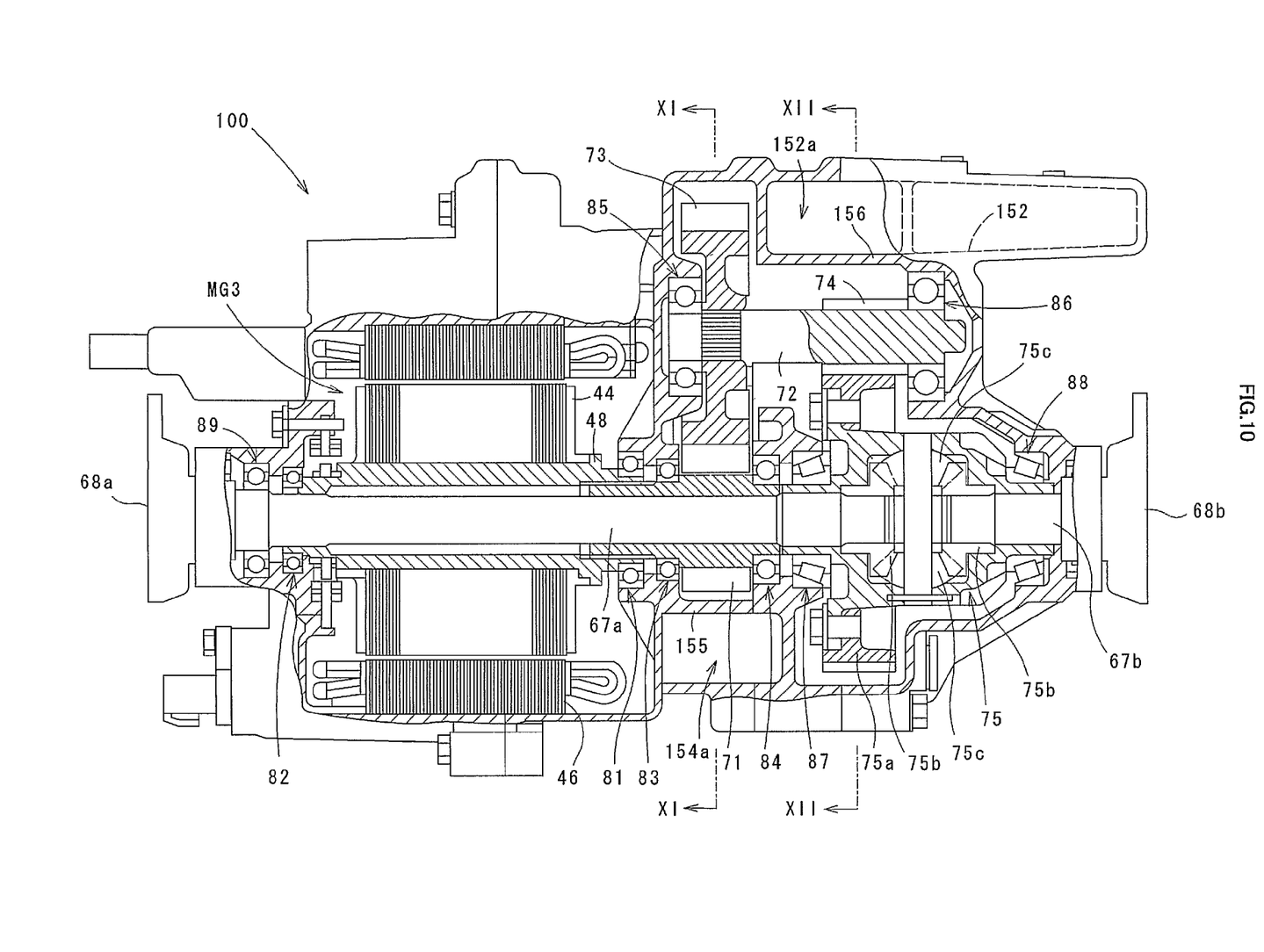
FIG. 10 schematically illustrates the configuration of a rear wheel drive system constructed as a drive assembly in a second embodiment of the invention.

FIG. 10 is a partially sectional view schematically illustrating the structure of primary part of a rear wheel drive system 100, which is mounted on the hybrid vehicle 20 as the drive assembly of the second embodiment. The rear wheel drive system 100 of the second embodiment shown in FIG. 10 has a transversely-arranged motor MG3 and a gear train 70 including a differential gear 75 that is connected to a motor shaft 48 of the motor MG3 and is linked to rear shafts 66a and 66b of rear wheels 65a and 65b. The power of the motor MG3 goes through speed reduction and is transmitted to the rear shafts 66a and 66b to drive the rear wheels 65a and 65b. The gear train 70 in the rear wheel drive system 100 has, in addition to the differential gear 75, a counter drive gear 71 that is mounted on one end of the motor shaft 48 connecting with a rotor 44 of the motor MG3, a counter driven gear 73 that is mounted on one end of a counter shaft 72 and engages with the counter drive gear 71, and a differential pinion gear 74 that is mounted on the other end of the counter shaft 72. The differential gear 75 includes a differential ring gear 75a engaging with the differential pinion gear 74, two side gears 75b connecting with the rear shafts 66a and 66b, and a pinion gear 75c. In the differential gear 75 of this embodiment, the left side gear 75b is coupled with the rear shaft 66a via a transmission shaft 67a as an axle and a coupling member 68a, whereas the right side gear 75b is coupled with the rear shaft 66b via a transmission shaft 67b as an axle and a coupling member 68b. The counter drive gear 71, the counter driven gear 73, the differential pinion gear 74, and the differential ring gear 75a of the differential gear 75 are combined to function as a reduction gear unit.

As shown in FIG. 10, the motor shaft 48 of the motor MG3 and the counter drive gear 71 mounted on the motor shaft 48 are both hollow. The transmission shaft 67a extended leftward (in the drawing) from the differential gear 75 run through the hollow centers of the motor shaft 48 and the counter drive gear 71. In the rear wheel drive system 100 of the second embodiment, the motor MG3 is arranged parallel to and coaxially with the transmission shafts 67a and 67b as the axle (and eventually parallel to and coaxially with the rear shafts 66a and 66b). This arrangement desirably attains the overall size reduction of the rear wheel drive system 100, compared with the arrangement of the motor MG3 and the gear train 70 with the motor shaft 48 and the transmission shafts 67a and 67b (the rear shafts 66a and 66b) apart from each other across a certain space in a longitudinal direction of the vehicle (that is, in a direction substantially perpendicular to the transmission shafts 67a and 67b). The coaxial arrangement of the motor MG3 and the transmission shafts 67a and 67b locates the counter shaft 72 of the gear train 70 ahead of (upward in the drawing) the transmission shafts 67a and 67b and the rear shafts 66a and 66b in the vehicle. This causes the axial centers of the larger-diameter counter driven gear 73 and the larger-diameter differential ring gear 75a, which have larger diameters than those of the counter drive gear 71 and the differential pinion gear 74 among the gears in the gear train 70, to be apart from each other in the longitudinal direction of the vehicle (that is, in the direction substantially perpendicular to the transmission shafts 67a and 67b). In the rear wheel drive system 100 of the second embodiment, the axial center of the counter shaft 72 is located below the axial centers of the motor shaft 48 and the counter drive gear 71. The lower end of the counter driven gear 73 is thus located below the lower end of the differential ring gear 75a (see FIGS. 11 and 12).

Figure 11:
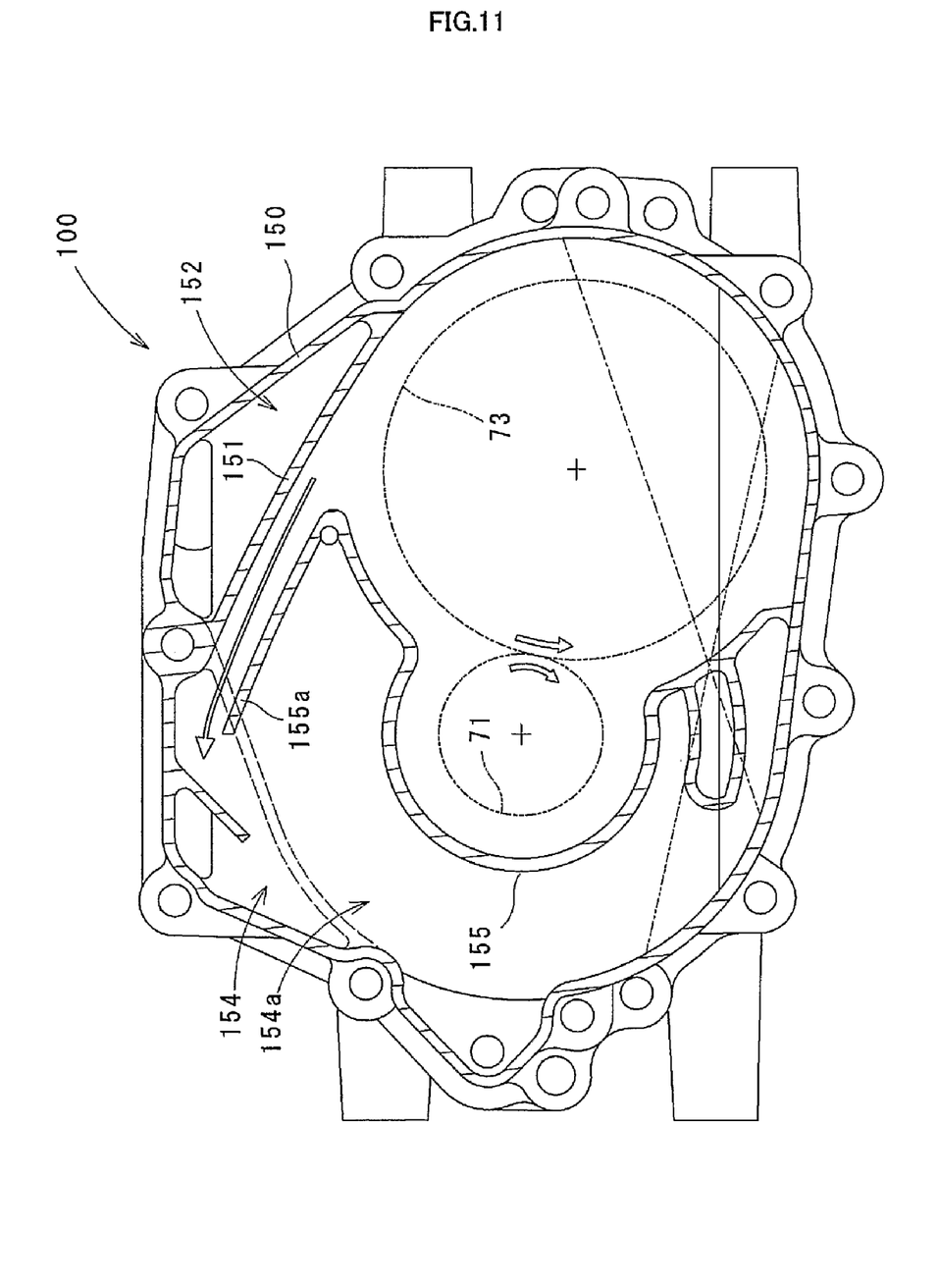
FIG. 11 is a partly sectional view showing the rear wheel drive system along a line XI-XI in FIG. 10.
Figure 12:
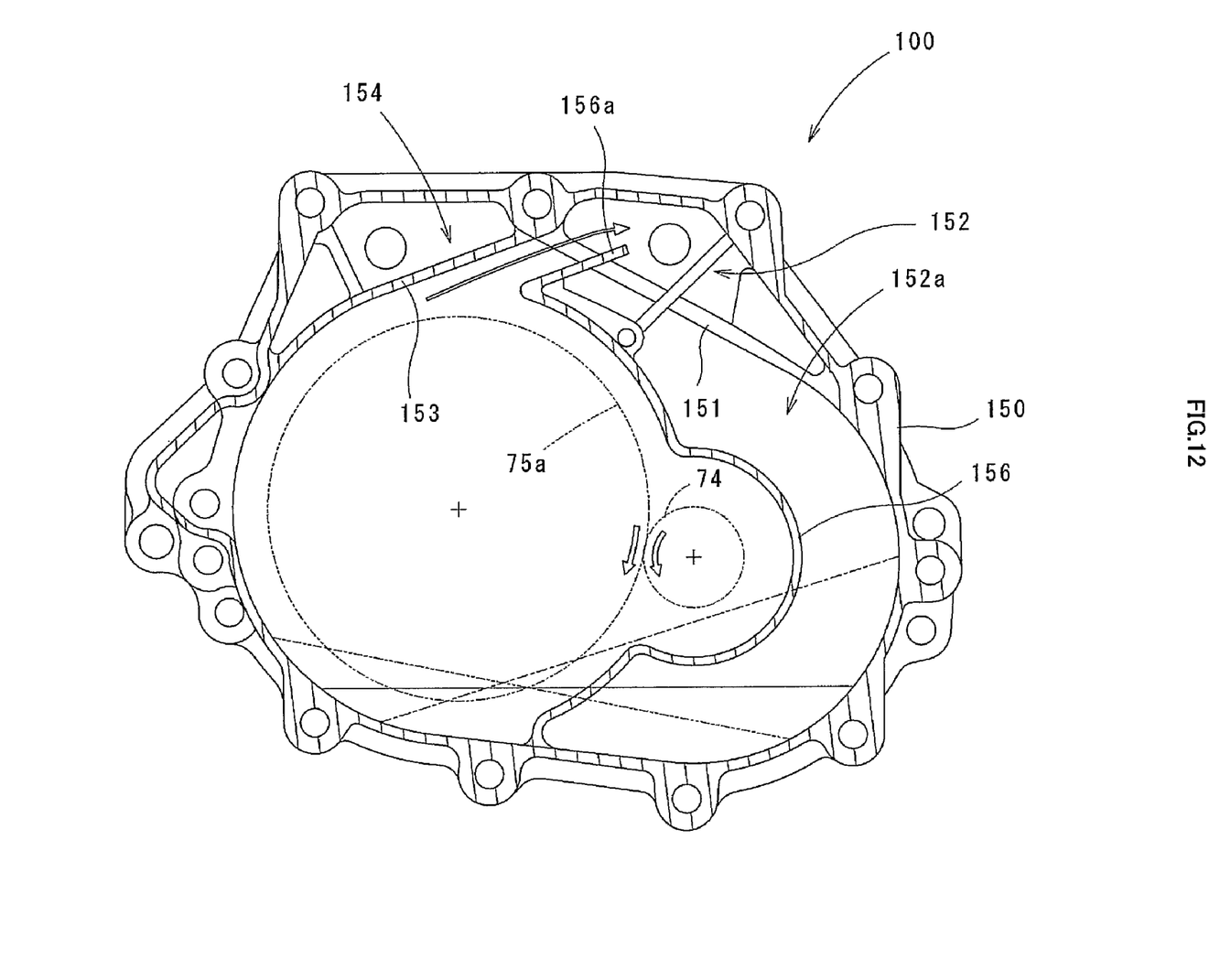
FIG. 12 is a partly sectional view showing the rear wheel drive system along a line XII-XII in FIG. 10.

The rear wheel drive system 100 of the embodiment has a lubricating mechanism described below. FIG. 11 is a sectional view showing the rear wheel drive system along a line XI-XI in FIG. 10. FIG. 12 is a sectional view showing the rear wheel drive system along a line XII-XII in FIG. 10. As clearly understood from FIGS. 11 and 12, a casing 150 of the rear wheel drive system 100 receives the motor MG3 and the gear train 70 therein and keeps lubricating oil accumulated in a bottom thereof to allow immersion of the lower portions of the large-diameter counter driven gear 73 and the large-diameter differential ring gear 75a of the differential gear 75. As shown in FIGS. 11 and 12, a front catch tank 152 provided as an upper reservoir is defined by the inner wall of the casing 150 and a partition wall 151 and is located in an inner upper portion of the casing 150 on the front side (on the right side in the drawings) of the vehicle. A rear catch tank 154 provided as a separate upper reservoir from the front catch tank 152 is defined by the inner wall of the casing 150 and a partition wall 153 and is located in the inner upper portion of the casing 150 on the rear side (on the left side in the drawings) of the vehicle. The front catch tank 152 is extended along the width of the vehicle (in the direction substantially parallel to the transmission shafts 67a and 67b) to mainly cover the counter drive gear 73 and the differential pinion gear 74. The rear catch tank 154, on the other hand, is extended along the width of the vehicle to mainly cover the counter drive gear 71 and the differential ring gear 75a.

As shown in FIG. 11, a partition wall 155 is fixed inside the casing 150 to be located lateral to the counter drive gear 71 and the counter driven gear 73 and at the rear (on the left in the drawing) of the counter drive gear 71 in the vehicle. The partition wall 155 has a width that is at least equal to the thicknesses (that is, the lengths in the axial direction) of the counter drive gear 71 and the counter driven gear 73. The partition wall 155 is curved to be extended along the counter drive gear 71 and the counter driven gear 73 and has a guide end 155a protruded upward and rearward (leftward in the drawing) of the vehicle. The partition wall 153 defining the rear catch tank 154 has an opening to receive the guide end 155a of the partition wall 155. During the normal operation of the motor MG3 in the forward direction of the hybrid vehicle 20, the lubricating oil accumulated in the bottom of the casing 150 as the lower reservoir is scooped up by means of the counter driven gear 73, which rotates in the reverse direction to the rotations of the motor shaft 48 and the counter drive gear 71. The scooped-up lubricating oil is guided by the guide end 155a of the partition wall 155 and is led to and kept in the rear catch tank 154 as shown by an open arrow in FIG. 11. The rear catch tank 154 has a cavity 154a, which is mainly defined by the inner wall of the casing 150 and the rear face (the left face in the drawing) of the partition wall 155. The lubricating oil that has not been led to the upper space of the rear catch tank 154 flows through the cavity 154a and runs down in the casing 150. The partition wall 155 also functions to form an appropriate oil pool in the vicinity of the counter drive gear 71 and the counter driven gear 73.

As shown in FIG. 12, a partition wall 156 is fixed inside the casing 150 to be located lateral to the differential pinion gear 74 and the differential ring gear 75a and ahead (on the right in the drawing) of the differential pinion gear 74 in the vehicle. The partition wall 156 has a width that is at least equal to the thicknesses (that is, the lengths in the axial direction) of the differential pinion gear 74 and the differential ring gear 75a. The partition wall 156 is curved to be extended along the differential pinion gear 74 and the differential ring gear 75a and has a guide end 156a protruded upward and forward (rightward in the drawing) of the vehicle. The partition wall 151 defining the front catch tank 152 has an opening to receive the guide end 156a of the partition wall 156. During the normal operation of the motor MG3 in the forward direction of the hybrid vehicle 20, the lubricating oil accumulated in the bottom of the casing 150 as the lower reservoir is scooped up by means of the differential ring gear 75a, which rotates in the same direction as the rotations of the motor shaft 48 and the counter drive gear 71. The scooped-up lubricating oil is guided by the guide end 156a of the partition wall 156 and is led to and kept in the front catch tank 152 as shown by an open arrow in FIG. 12. The front catch tank 152 has a cavity 152a, which is mainly defined by the inner wall of the casing 150 and the front face (the right face in the drawing) of the partition wall 156. The lubricating oil that has not been led to the upper space of the front catch tank 152 flows through the cavity 152a and runs down in the casing 150. The partition wall 156 also functions to form an appropriate oil pool in the vicinity of the differential pinion gear 74 and the differential ring gear 75a.

Figure 13:
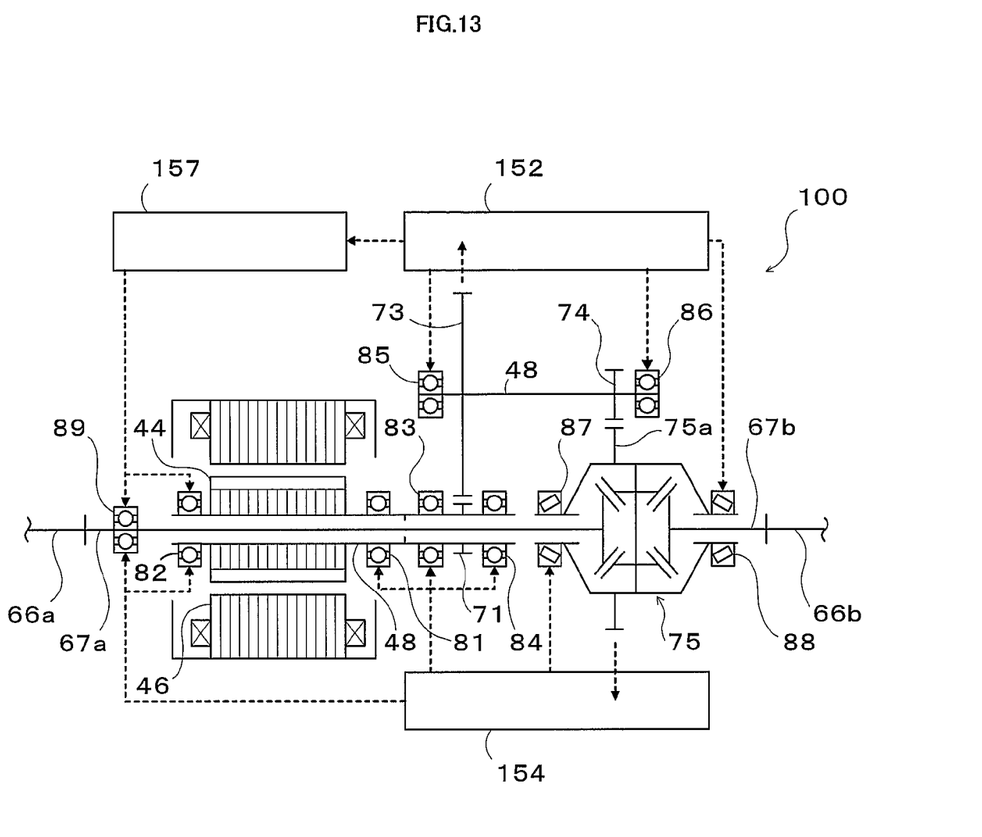
FIG. 13 shows a lubricating structure in the rear wheel drive system of the second embodiment.

In the rear wheel drive system 100 of the second embodiment, the lubricating oil kept in the front catch tank 152 and in the rear catch tank 154 is flowed down mainly by the force of gravity and is fed to all the oil-requiring sites, for example, bearings 81 through 89 supporting the motor shaft 48, the transmission shaft 67a, the shaft of the counter drive gear 71, the counter shaft 72, and the differential gear 75. More specifically, as shown in FIG. 13, the lubricating oil kept in the front catch tank 152 is flowed down mainly by the force of gravity through oil paths formed in appropriate places of the casing 150 and is fed to the bearings 85 and 86 supporting the counter shaft 72 and to the bearing 88 supporting the differential gear 75. The lubricating oil kept in the rear catch tank 154 is flowed down mainly by the force of gravity through oil paths formed in appropriate places of the casing 150 and is fed to the bearings 81 and 82 supporting the motor shaft 48, to the bearings 83 and 84 supporting the counter drive gear 71, to the bearing 87 supporting the differential gear 75, and to the bearing 89 supporting the transmission shaft 67a. The rear wheel drive system 100 of the second embodiment has an additional catch tank 157, which may be located on an upper front side of the motor MG3, in addition to the front catch tank 152 and the rear catch tank 154 as shown in FIG. 13. The additional catch tank 157 communicates with the front catch tank 152 via an oil path and keeps the lubricating oil scooped up by the rotor 44 of the motor MG3. The lubricating oil kept in the additional catch tank 157 runs through appropriate oil paths (not shown) and is fed to the bearing 82 supporting the motor shaft 48 and to the bearing 89 supporting the transmission shaft 67a.

In the rear wheel drive system 100 of the above configuration, as shown in FIGS. 11 and 12, during a drive of the hybrid vehicle 20 on the practically horizontal road surface, the counter driven gear 73 and the differential ring gear 75a respectively work to scoop up the lubricating oil accumulated in the bottom of the casing 150 to the front catch tank 152 and to the rear catch tank 154. The lubricating oil kept in the front catch tank 152 and in the rear catch tank 154 is fed to the multiple bearings 81 through 89. The counter driven gear 73 rotates at a higher speed than the differential ring gear 75a, and the lower end of the counter driven gear 73 is located below the lower end of the differential ring gear 75a as mentioned previously. In the forward tilting attitude of the rear wheel drive system 100 during a drive of the hybrid vehicle 20 either on the practically horizontal road surface or on a downhill, as shown by the one-dot chain lines in FIGS. 11 and 12, the amount of lubricating oil pool for soaking the counter driven gear 73 is greater than the amount of lubricating oil pool for soaking the differential ring gear 75a. The scoop-up of lubricating oil by the counter driven gear 73 is thus accelerated especially during a drive of the hybrid vehicle 20 on a downhill. Size expansion of a gear module of the counter drive gear 71 and the counter driven gear 73 compared with the other gear modules preferably increases the amount of lubricating oil pool for soaking the counter driven gear 73 (that is, heightens the lubricating oil level). In the backward tilting attitude of the rear wheel drive system 100 during a drive of the hybrid vehicle 20 on an uphill, on the other hand, as shown by the two-dot chain lines in FIGS. 11 and 12, the amount of lubricating oil pool for soaking the differential ring gear 75a is greater than the amount of lubricating oil pool for soaking the counter driven gear 73. The scoop-up of lubricating oil by the differential ring gear 75a is thus accelerated especially during a drive of the hybrid vehicle 20 on an uphill.

As described above, the rear wheel drive system 100 of the second embodiment is designed to vary its tilting attitude and accordingly allow at least either the counter driven gear 73 or the differential ring gear 75a to scoop up the lubricating oil accumulated in the bottom of the casing 150 into the corresponding front catch tank 152 or into the corresponding rear catch tank 154. Even in the varying attitude of the rear wheel drive system 100 mounted on the hybrid vehicle 20, this design ensures sufficient storage of lubricating oil in both the front catch tank 152 and the rear catch tank 154 and enables the smooth supply of lubricating oil to the individual bearings 81 through 89. The axial center of the counter driven gear 73 working for the oil scoop-up to the front catch tank 152 is apart from the axial center of the differential ring gear 75a working for the oil scoop-up to the rear catch tank 154 in the direction substantially perpendicular to the transmission shafts 67a and 67b as the axle. In the forward tilting attitude or in the backward tilting attitude of the rear wheel drive system 100 mounted on the hybrid vehicle 20, at least one of the counter driven gear 73 and the differential ring gear 75a works to scoop up the lubricating oil to the corresponding front catch tank 152 or to the corresponding rear catch tank 154. This arrangement ensures the effective supply of lubricating oil to the individual bearings 81 through 89. The front catch tank 152 and the rear catch tank 154 are located in the vicinity of the gear train 70 to cover the relevant front part and the relevant rear part of the gear train 70. The lubricating oil kept in the front catch tank 152 and in the rear catch tank 154 thus effectively reduces the potential vibrations of the rear wheel drive system 100 due to the gear engagement noise and the potential membrane oscillation of the casing 150. The rear wheel drive system 100 of this embodiment accordingly does not require application of any damping paint or use of any acoustic insulating material and desirably saves the cost and the space required for vibration suppression.

The rear wheel drive system 100 of the second embodiment may be constructed as a front wheel drive system to drive the front wheels 63a and 63b of the hybrid vehicle 20. The power source for driving the rear wheels 65a and 65b is not restricted to the motor MG3. The rear wheels 65a and 65b may be driven with the output power of any other power source, for example, an engine. In the hybrid vehicle 20 equipped with the rear wheel drive system 100 of the second embodiment, the front wheels 63a and 63b may be driven with the output power of only an engine, with the output power of only a motor, or with the output power of any other power source. The rear wheel drive system 100 of the second embodiment may be constructed as a front wheel drive system or a rear wheel drive system of a two-wheel-drive motor vehicle.

The embodiments and their modifications discussed above are to be considered in all aspects as illustrative and not restrictive. There may be many other modifications, changes, and alterations without departing from the scope or spirit of the main characteristics of the present invention. All changes within the meaning and range of equivalency of the claims are intended to be embraced therein. The scope and spirit of the present invention are indicated by the appended claims, rather than by the foregoing description.

INDUSTRIAL APPLICABILITY

The technique of the invention is preferably applied to the automobile industries and diversity of relevant industries.

The invention claimed is:

1. A drive assembly that is mounted on a motor vehicle driven with power output to an axle and works to actuate the axle, the drive assembly comprising:
   a power source unit that outputs power to the axle; and
   a fluid medium supply mechanism that includes a lower fluid reservoir and a plurality of upper fluid reservoirs and causes a fluid medium retained in the plurality of upper fluid reservoirs to be flowed down by the force of gravity and to be fed to plural different sites of the power source unit, the lower fluid reservoir formed in a lower portion of the drive assembly to retain the fluid medium accumulated therein for soaking at least respective parts of plural mechanical elements of the power source unit, the plurality of upper fluid reservoirs formed at a plurality of different locations in an upper portion of the drive assembly to retain the fluid medium scooped up by the plural mechanical elements,
   wherein the multiple upper fluid reservoirs include a first upper fluid reservoir that retains the fluid medium scooped up by a rotating electrical machine and a second upper fluid reservoir that retains the fluid medium scooped by a gear train.

2. A drive assembly in accordance with claim 1, wherein the fluid medium supply mechanism has at least one guide element that changes a flow direction of the fluid medium scooped up by at least one of the plural mechanical elements of the power source unit and guides the changed flow of the fluid medium to at least one of the upper fluid reservoirs corresponding to the at least one of the mechanical elements.

3. A drive assembly in accordance with claim 1, wherein the power source unit includes the rotating electrical machine having at least one portion soaked in the fluid medium accumulated in the lower fluid reservoir, and the gear train having at least one portion soaked in the fluid medium accumulated in the lower fluid reservoir, the gear train mechanically connecting a rotating shaft of the rotating electrical machine with the axle of the motor vehicle, and
   the fluid medium supply mechanism feeds the fluid medium retained in the first upper fluid reservoir to a specific site near to the first upper fluid reservoir among the plural different sites of the power source unit, and feeds the fluid medium retained in the second upper fluid reservoir to a specific site near to the second upper fluid reservoir among the plural different sites of the power source unit.

4. A drive assembly in accordance with claim 3, wherein the rotating electrical machine is transversely arranged to have the rotating shaft substantially parallel to the axle of the motor vehicle, and
   the first upper fluid reservoir is located adjacent to the rotating electrical machine on a side of the axle.

5. A drive assembly in accordance with claim 3, wherein the rotating electrical machine is a motor having a rotor with salient poles formed thereon.

6. A drive assembly in accordance with claim 3, wherein the rotating electrical machine has a rotor with a scoop-up acceleration member for accelerating scoop-up of the fluid medium into the first upper fluid reservoir.

7. A drive assembly in accordance with claim 1, wherein the power source unit includes the rotating electrical machine and the gear train having at least one portion soaked in the fluid medium accumulated in the lower fluid reservoir, the gear train mechanically connecting a rotating shaft of the rotating electrical machine with the axle of the motor vehicle, and each of the upper fluid reservoirs is arranged to correspond to any gear of the gear train and retains the fluid medium scooped up by the corresponding gear, at least one gear corresponding to the upper fluid reservoir being capable of scooping up the fluid medium accumulated in the lower fluid reservoir to the corresponding upper fluid reservoir in accordance with an attitude of the drive assembly.

8. A drive assembly in accordance with claim 7, wherein the rotating electrical machine is transversely arranged to have the rotating shaft substantially parallel to the axle of the motor vehicle, the gear train includes at least two large-diameter gears respectively having an axial center and at least one portion soaked in the fluid medium accumulated in the lower fluid reservoir, the axial centers of the large-diameter gears being apart from each other in a direction substantially perpendicular to the axle of the motor vehicle, and the plurality of upper fluid reservoirs includes at least two upper fluid reservoirs respectively arranged to correspond to the large-diameter gear.

9. A drive assembly in accordance with claim 1, wherein the power source unit includes the rotating electrical machine and the gear train having at least one portion soaked in the fluid medium accumulated in the lower fluid reservoir, the gear train mechanically connecting a rotating shaft of the rotating electrical machine with the axle of the motor vehicle, and the upper fluid reservoirs are arranged in a periphery of the gear train.

10. A motor vehicle that is equipped with a drive assembly that works to actuate an axle, said motor vehicle comprising:

a power source unit that outputs power to the axle; and a fluid medium supply mechanism that includes a lower fluid reservoir and a plurality of upper fluid reservoirs and causes a fluid medium retained in the plurality of upper fluid reservoirs to be flowed down by the force of gravity and to be fed to plural different sites of the power source unit, the lower fluid reservoir formed in a lower portion of the drive assembly to retain the fluid medium accumulated therein for soaking at least respective parts of plural mechanical elements of the power source unit, the plurality of upper fluid reservoirs formed at a plurality of different locations in an upper portion of the drive assembly to retain the fluid medium scooped up by the plural mechanical elements, wherein the plurality of upper fluid reservoirs include a first upper fluid reservoir that retains the fluid medium scooped up by a rotating electrical machine and a second upper fluid reservoir that retains the fluid medium scooped by a gear train.

* * * * *